United States Patent
Chaumat et al.

(10) Patent No.: US 9,776,929 B2
(45) Date of Patent: Oct. 3, 2017

(54) METHOD FOR ASSEMBLING PARTS MADE OF SIC MATERIALS BY MEANS OF NON-REACTIVE BRAZING IN AN OXIDIZING ATMOSPHERE, BRAZING COMPOSITIONS, AND GASKET AND ASSEMBLY OBTAINED BY SAID METHOD

(71) Applicant: COMMISSARIAT À L'ÉNERGIE ATOMIQUE ET AUX ÉNERGIES ALTERNATIVES, Paris (FR)

(72) Inventors: Valérie Chaumat, Saint-Paul de Varces (FR); Jean-François Henne, Bethune (FR); Fiqiri Hodaj, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/366,432

(22) PCT Filed: Dec. 20, 2012

(86) PCT No.: PCT/EP2012/076515
§ 371 (c)(1),
(2) Date: Jun. 18, 2014

(87) PCT Pub. No.: WO2013/092931
PCT Pub. Date: Jun. 27, 2013

(65) Prior Publication Data
US 2014/0328615 A1    Nov. 6, 2014

(30) Foreign Application Priority Data

Dec. 22, 2011 (FR) ..................... 11 62346

(51) Int. Cl.
*B23K 31/00*    (2006.01)
*B23K 31/02*    (2006.01)
(Continued)

(52) U.S. Cl.
CPC ............ *C04B 37/00* (2013.01); *B23K 1/0008* (2013.01); *B23K 1/19* (2013.01); *B23K 1/20* (2013.01);
(Continued)

(58) Field of Classification Search
CPC .......... C04B 2237/365; C04B 2237/82; C04B 37/005; Y10T 156/10; Y10T 403/479; B23K 1/20; B23K 35/327; B23K 35/36
See application file for complete search history.

(56) References Cited

U.S. PATENT DOCUMENTS 5,447,683 A    9/1995    Montgomery et al.
5,975,407 A    11/1999    Gasse et al.
(Continued)

FOREIGN PATENT DOCUMENTS

FR    2538370 A1    6/1984
FR    2935376 A1    3/2010
(Continued)

OTHER PUBLICATIONS www.azom.com, AZO Materials, Mar. 6, 2001.*
(Continued)

*Primary Examiner* — Erin Saad
(74) *Attorney, Agent, or Firm* — Hultquist, PLLC; Mary B. Grant

(57) ABSTRACT

A method is described for assembling at least two parts made of silicon carbide based materials by non-reactive brazing in an oxidizing atmosphere, each of the parts comprising a surface to be assembled, wherein the parts are placed in contact with a non-reactive brazing composition, the assembly formed by the parts and the brazing composition is heated to a brazing temperature sufficient for completely or at least partially melting the brazing composition, or rendering the brazing composition viscous, and the parts and
(Continued)

the brazing composition are cooled so as to form, after cooling the latter to ambient temperature, a moderately refractory joint. The non-reactive brazing composition is a composition A consisting of silica ($SiO_2$), alumina ($Al_2O_3$), and calcium oxide (CaO), or a composition B consisting of alumina ($Al_2O_3$), calcium oxide (CaO), and magnesium oxide (MgO), and, before heating the assembly formed by the parts and the brazing composition to the brazing temperature, a supply of silicon in a non-oxidized form is carried out on the surfaces to be assembled of the parts to be assembled, and/or on the surface layers comprising the surfaces to be assembled of the parts to be assembled, and/or in the brazing composition.

34 Claims, 4 Drawing Sheets

(51) Int. Cl.
*C04B 37/00* (2006.01)
*B23K 1/00* (2006.01)
*B23K 1/19* (2006.01)
*B23K 1/20* (2006.01)
*B23K 35/30* (2006.01)
*B23K 35/36* (2006.01)
*C03C 3/062* (2006.01)
*C03C 3/087* (2006.01)
*C03C 3/12* (2006.01)
*C03C 8/02* (2006.01)
*C03C 8/24* (2006.01)

(52) U.S. Cl.
CPC .............. *B23K 35/30* (2013.01); *B23K 35/36* (2013.01); *C03C 3/062* (2013.01); *C03C 3/087* (2013.01); *C03C 3/125* (2013.01); *C03C 8/02* (2013.01); *C03C 8/24* (2013.01); *C04B 37/005* (2013.01); *C04B 2235/6562* (2013.01); *C04B 2235/6565* (2013.01); *C04B 2235/6567* (2013.01); *C04B 2235/6583* (2013.01); *C04B 2235/96* (2013.01); *C04B 2237/062* (2013.01); *C04B 2237/064* (2013.01); *C04B 2237/09* (2013.01); *C04B 2237/095* (2013.01); *C04B 2237/10* (2013.01); *C04B 2237/16* (2013.01); *C04B 2237/365* (2013.01); *C04B 2237/38* (2013.01); *C04B 2237/55* (2013.01); *C04B 2237/704* (2013.01); *C04B 2237/72* (2013.01); *C04B 2237/82* (2013.01); *Y10T 156/10* (2015.01); *Y10T 403/479* (2015.01)

(56) References Cited

U.S. PATENT DOCUMENTS

| | | |
|---|---|---|
| 2003/0038166 A1 | 2/2003 | Gasse |
| 2005/0079343 A1 | 4/2005 | Raybould et al. |
| 2005/0167409 A1 | 8/2005 | Knorr et al. |
| 2010/0055498 A1 | 3/2010 | Mailliart et al. |
| 2010/0075160 A1 | 3/2010 | Chaumat et al. |
| 2013/0064602 A1 | 3/2013 | Chaumat et al. |
| 2014/0186102 A1 | 7/2014 | Chaumat et al. |

FOREIGN PATENT DOCUMENTS

| | | |
|---|---|---|
| GB | 1246694 A | 9/1971 |
| GB | 1315319 A | 5/1973 |

OTHER PUBLICATIONS

Fernie, J., et al., "Ceramic Reinforced Metal Braze Alloys for Joining Silicon Carbide", "British Ceramic Proceedings", 1999, pp. 317-318, vol. 60.

Ferraris, M., et al., "Glass-ceramic joining and coating of SiC/SiC for fusion applications", "Journal of Nuclear Materials", 1998, pp. 1546-1550, vol. 258-263.

Ferraris, M., et al., "Cordieritemullite coating for SiCf/SiC composites", "Journal of the European Ceramic Society", 2002, pp. 2343-2347, vol. 22.

Hanson, W., et al., "Active Metal Brazing: The Role of the Braze Alloy", "Joining of Advanced and Specialty Materials: Proceedings from Materials Solutions Conference '99", Nov. 1-4, 1999, pp. 53-58, Published in: Cincinnati, OH.

Katoh, Y., et al., "Microstructure and mechanical properties of low-activation glass-ceramic joining and coating for SiC/SiC composites", "Journal of Nuclear Materials", 2000, pp. 1262-1266, vol. 283-287.

Lee, H., et al., "Joining of silicon carbide using MgO—Al2O3—SiO2 filler", "Journal of Materials Science", 1998, pp. 5007-5014, vol. 33.

Lippmann, W., et al., "Laser joining of silicon carbide—a new technology for ultra-high temperature resistant joints", "Nuclear Engineering and Design", 2004, pp. 151-161, vol. 231.

Perham, T., et al., "Joining of Silicon Carbide with a Cordierite Glass-Ceramic", "J. Am. Ceram. Soc.", 1999, pp. 297-305, vol. 82, No. 2.

Prakash, P., et al., "Microstructural characterization of SiC ceramic and SiC-metal active metal brazed joints", "Scripta Materialia", Mar. 13, 2005, pp. 1169-1173, vol. 52.

Rankin, V., et al., "Das ternaere System: Calciumoxyd-Aluminiumoxyd-Magnesiumoxyd", "Zeitschrift fuer anorganische und allgemeine Chemie", Aug. 24, 1916, pp. 291-316, vol. 96, No. 1.

Rankin, V., et al., "Das ternaere System: Calciumoxyd-Aluminiumoxyd-Magnesiumoxyd", "Zeitschrift fuer anorganische und allgemeine Chemie", Aug. 24, 1916, pp. 291-316 (Machine English Translation Abstract), vol. 96, No. 1.

Tamari, N., et al., "Joining of Silicon Carbide Ceramics with Si3N4—Y2O3—La2O3—MgO Mixture", "Yogyo-Kyokai-Shi", 1986, p. 1087 vol. 94, No. 10.

Lemoine, P., et al., "Vitreous Joining Process of SiCf/SiC Composites", "Journal of the European Ceramic Society", 1996, pp. 1231-1236, vol. 16.

Unpublished U.S. Appl. No. 14/366,172, filed Jun. 17, 2014.

\* cited by examiner

METHOD FOR ASSEMBLING PARTS MADE OF SIC MATERIALS BY MEANS OF NON-REACTIVE BRAZING IN AN OXIDIZING ATMOSPHERE, BRAZING COMPOSITIONS, AND GASKET AND ASSEMBLY OBTAINED BY SAID METHOD

CROSS-REFERENCE TO RELATED APPLICATIONS

This application is a U.S. national phase under the provisions of 35 U.S.C. §371 of International Patent Application No. PCT/EP12/76515 filed Dec. 20, 2012, which in turn claims priority of French Patent Application No. 1162346 filed Dec. 22, 2011. The disclosures of such international patent application and French priority patent application are hereby incorporated herein by reference in their respective entireties, for all purposes.

TECHNICAL FIELD

The present invention relates to a method for assembling parts made of silicon carbide based materials by non-reactive brazing in an oxidizing atmosphere, more specifically in an atmosphere containing oxygen, particularly in air, with a non-reactive brazing composition, in order particularly to form components entirely based on silicon carbide.

The invention relates, moreover, to brazing compositions, and to the joint and the assembly obtained by said method.

"Silicon carbide based" material is generally taken to mean a material in which the SiC content is greater than or equal to 50% by weight, preferably greater than or equal to 80% by weight, even more preferably 100% by weight, in the latter case it may be said that the material consists of or is composed of silicon carbide.

These silicon carbide based materials may be particularly pure silicon carbide such as pure α (SiCα) or β (SiCβ) silicon carbide or SiC based composite materials such as composites with fibres and/or silicon carbide matrix.

The silicon carbide based material may take the form of silicon carbide fibres or silicon carbide powder sintered or bound by a ceramic binder.

The technical field of the invention may be defined as being that of what is known as "moderately refractory" brazing, in other words implemented at temperatures generally from 1050° C. to 1350° C., preferably 1100° C. to 1200° C.

The assemblies concerned by the present invention are thus generally considered as "moderately refractory", in other words that the maximum operating temperatures of said assemblies go generally up to 1250° C. and are generally comprised between 850° C. and 1200° C. as a function of the composition of the brazing alloy or the brazing composition.

These assemblies may enter into the manufacture of components of complex shapes requiring both very good mechanical strength between the silicon carbide based materials, and satisfactory leak tightness on either side of the joint.

STATE OF THE PRIOR ART

It is known that it is difficult to manufacture parts of large dimensions made of ceramic, in particular, SiC. In fact, the tolerances after sintering of the primary components or silicon carbide of large dimensions are poorly controlled and the machining of these components is unacceptable for cost reasons.

Furthermore, and for the same reasons, it is generally difficult to manufacture parts of complex shape with silicon carbide based compounds.

It is thus often preferable to manufacture parts or structures of large dimension and/or of complex shape from ceramic elements of simple shape and/or of small size, then assembling said elements to form the final structure.

Such a technique is particularly necessary to manufacture structures of heat exchanger type, burners, thermal resistances of structural components made of silicon carbide having an operating temperature, for example, up to 1200° C.

Due to the high temperatures, close for example to 1000° C., implemented in the applications of ceramics such as silicon carbide, the assembly of said ceramics by bonding with organic adhesives is excluded, because the operating temperatures of this type of assembly cannot exceed at the most 200° C.

Purely mechanical assemblies, for example by stapling or by screwing, only assure partial and random contact between the parts. The assemblies thereby obtained cannot be leak tight.

Furthermore, conventional techniques of assembly by welding involving an energy beam with or without added metal (TIG, electron or laser welding) and involving partial melting of the parts to be assembled cannot be used for the assembly of ceramics due to the fact that it is not possible to melt a substrate or a part made of ceramic, and that, in particular, silicon carbide decomposes before melting.

Routine techniques for producing refractory assemblies of ceramics are diffusion welding in solid phase, and sintering or co-sintering assembly.

In assembly by diffusion welding, a pressure is applied at high temperature at the level of the interfaces to enable atomic inter-diffusion between the two substrates. The temperature must always remain below the melting temperature of the least refractory material and there is thus no liquid phase in the system. This type of assembly is formed either under press in a single direction, or in an isostatic chamber. Diffusion welding is well suited to assemblies between two metal alloys and very poorly suited to the assembly of ceramic materials because the atoms constituting the ceramic diffuse very little at the level of the joint. Moreover, the method is totally unacceptable from a mechanical viewpoint, because it requires placing in compression the substrates and porous and fragile materials such as silicon carbide based substrates, which risk being seriously damaged during this mechanical compression loading.

The assembly-sintering or co-sintering of SiC parts also requires high pressures but also high temperatures and long plateau durations, because this method is based on the principle of inter-diffusion between SiC elements.

In other words, diffusion welding in solid phase as well as sintering assembly have the disadvantage of being restrictive from the implementation point of view because:

for diffusion welding in solid phase, the shape of the parts needs to remain simple if uniaxial pressing is used, or require complex tooling and preparation comprising for example the manufacture of an envelope, leak tight sealing in a vacuum, hot isostatic compression, final machining of the envelope, if HIP (Hot Isostatic Pressing) is used.

in the case of co-sintering or sintering assembly, the same problems remain (shape of the parts, implementation complexity) with in addition the need to control the sintering of a powder added to intercalate between the two materials to be assembled.

these two techniques moreover require the use of plateaus of long duration (one to several hours) at high temperature since the processes brought into play involve diffusion in the solid state.

It is clear from the above, and to resume, that in order to guarantee particularly good mechanical strength and satisfactory sealing at the level of the assembly, only methods using a liquid phase, like brazing, may be envisaged.

Brazing is a technique that is not very costly, easy to implement, which is the most widely used. Parts of complex shape may be produced by carrying out brazing, and the brazing operations are limited to placing between ("sandwich" type brazing) the parts to be assembled or near (capillary type brazing) to the joint between the two parts, a brazing alloy, known as braze, or a filler alloy, said alloy being capable of wetting and spreading on the interfaces to be assembled to fill the joint between the parts and to melt said alloy. After cooling, the brazing solidifies and assures the cohesion of the assembly.

Numerous brazing compositions for parts made of silicon carbide based materials are not very refractory. They are generally brazing compositions consisting of metal alloys having a melting point below, or even far below, 1000° C. [1, 2, 3]. Such a melting temperature is clearly insufficient for applications at high temperatures close to 1000° C. or above, for example, up to 1250° C.

It should be noted, moreover, that the implementation of said brazes cannot take place in air, due to problems of oxidation of the brazing.

Furthermore, most of the chemical elements that form part of these metal brazing compositions are highly reactive with silicon carbide above 500° C. and create fragile compounds.

Consequently, in the case of a brazing implemented above 1000° C., such brazing compositions or brazing alloys would chemically attack silicon carbide based materials.

Moreover, the least reactive alloys are also the least refractory, such as for example, the alloy AgCuTi with an Ag—Cu matrix and Ti element active at low concentration. For the applications more particularly targeted by the invention, which are those of a moderately refractory assembly, with an operating temperature of the assemblies that can go generally up to 1000° C. or even 1250° C., all brazing compositions consisting mainly of silver or silver-copper, copper, nickel, iron or cobalt, platinum, palladium or gold are thus to be excluded due to their high reactivity and the fact that it is impossible to implement them in air.

In order to resolve the problems posed by brazing compositions consisting of metal alloys and particularly of reactive metal alloys, brazing compositions or formulations of brazing alloys based on silicon and with melting temperature above 1200° C. [4, 5, 6] have been proposed.

These brazing alloys consisting of metal silicides have the advantage of wetting silicon carbide well in a vacuum or in neutral atmosphere while being not very reactive and of assuring a good sealed mechanical interface between silicon carbide based substrates. On the other hand, the brazing method using these silicon based brazing compositions cannot be implemented in air.

In fact, in air, oxidation of the brazings and the SiC takes place, which does not enable good wetting. Consequently, brazing compositions, brazing alloys rich in silicon are not suited to brazing at temperatures above 1000° C. in air.

Furthermore, brazing compositions, brazing alloys, based on a mixture of oxides for the assembly of silicon carbide based materials have been proposed.

With such brazing compositions, the brazing method is, in the majority of cases, implemented in a protective atmosphere, for example of neutral gas, or in a vacuum, between 700° C. and 1600° C. according to the composition of the brazing alloy.

FERRARIS et col. have thus realised the assembly in argon of SiC/SiC composites with alloys such as the alloy $ZnO-B_2O_3-MgO-SiO_2-Al_2O_3-Na_2O$ implemented at 1200° C. [7] and the alloy 49.77 CaO-50.23 $Al_2O_3$ (% by weight) implemented at 1500° C. [8, 9].

Document FR-A-2 538 370 also describes the brazing in argon at 1400° C. of SiC with a brazing composition consisting of $SiO_2-Al_2O_3-MgO-Y_2O_3$ the composition in % by weight of which is the following: $32.5\% \leq SiO_2 + MgO \leq 77.5\%$; $17.5\% \leq Al_2O_3 \leq 62.5\%$; $5\% \leq Y_2O_3 \leq 50\%$) [10].

PERHAM et col. have carried out the brazing of SiC in a vacuum between 1465° C. and 1550° C. with the brazing composition 52.5% $SiO_2$-32.0% $Al_2O_3$-13.5% MgO-2.0% BaO [11].

TAMARI et col. propose a brazing composition made of $Si_3N_4-Y_2O_3-La_2O_3-MgO$ to braze silicon carbide between 1600° C. and 1800° C. in argon [12].

Finally, LEE et col. [13] describe the brazing of SiC in argon between 1350° C. and 1530° C. using a braze of composition 60 $SiO_2$-25 $Al_2O_3$-15MgO (% by weight).

To summarise, few works describe brazing operations in oxidizing atmosphere, particularly in air, of silicon carbide. The results of brazing in argon or in a vacuum cannot be transposed to an oxidizing atmosphere, particularly in air, in particular as regards the physical-chemical behaviour vis-à-vis the environment (diffusion of oxygen into the mixture of glass . . . ).

Nevertheless, some works relate to the brazing in air of silicon carbide with brazing compositions, brazing alloys, based on a mixture of oxides.

For instance, the brazing in air of silicon carbide from a mixture of oxides has been carried out by LIPMANN et col. [14, 15]. These authors propose a method of assembly in air of SiC by laser assisted brazing with a brazing composition of the system $Y_2O_3-SiO_2-Al_2O_3$ or of the system $ZrO_2-SiO_2-Al_2O_3$.

The main drawback of the laser assisted brazing method, implemented in these documents, is that it is not suited to all geometries and/or sizes of parts to be assembled. In particular, the laser assisted brazing method is not suitable for parts of large dimensions, more precisely to parts comprising large surfaces to be brazed, and/or having complex shape.

Thus, the surfaces assembled in documents [14, 15] are very small, of the order of 1 $cm^2$.

Furthermore, said laser assisted brazing method is costly.

Finally, the brazing compositions described in documents [14] and [15] withstand high temperatures, namely temperatures above 1600° C., and consequently require that the brazing operations are also carried out at high temperature, which risks degrading the SiC based material to be brazed such as sintered SiC or a composite based on SiC.

Maintaining these high temperatures must be limited because then an oxidation of the SiC takes place when the brazing is carried out in air.

For example, these high temperatures are not tolerated by certain materials, such as composites, the properties of which are degraded in an irreversible manner above 1100°

C. As example of these materials, the composite CERASEP® A40C, consisting of a SiC matrix and SiC fibres, may be cited.

It may be said that the brazing compositions described in documents [14] and [15] are limited to brazing implemented in a very localised and very rapid manner for small surfaces to be brazed.

In addition, said brazing compositions are prohibited for the brazing of certain SiC based materials due to the degradation of said materials at the high temperature at which the brazing is carried out.

This thus greatly restricts the applications of the brazing compositions described in documents [14] and [15].

MAILLIART et col. [16] have proposed brazing alloys in $SiO_2$—$Al_2O_3$—CaO and $Al_2O_3$—CaO—MgO systems for brazing in air.

The domain recommended by the inventors for the first system is, in weight percentages, 75% to 7% of $SiO_2$, 60% to 6% of $Al_2O_3$, and 60% to 10% of CaO. The drawback of this method is that it imposes a rather high brazing temperature, namely between 1350° C. and 1650° C., to obtain sufficient adherence and high mechanical properties.

It is in fact shown in document [16] that brazing at 1100° C. for 120 minutes, in the viscous domain of the glass based on the system $SiO_2$—$Al_2O_3$—CaO, enables the assembly of SiC based materials, but this assembly has much lower mechanical strength than that obtained at higher temperature.

This is clearly shown by the mechanical tests carried out in example no 2 of said document [16] on test specimens consisting of two parts made of pure sintered α SiC silicon carbide assembled by brazing with a brazing composition consisting of 62% by weight of $SiO_2$, 15% by weight of $Al_2O_3$ and 23% by weight of CaO.

In a first series of tests, five test specimens are prepared by brazing with this brazing composition, while implementing a thermal cycle of brazing at 1590° C. for 10 minutes, then compression/shear tests are carried out on said test specimens.

In a second series of tests, two other test specimens are prepared by brazing with this brazing composition, while implementing a thermal cycle of brazing at 1100° C. for 120 minutes, then compression/shear tests are carried out on these test specimens.

The first series of tests on the compression/shear test specimens assembled at 1590° C. for 10 minutes give an average tensile strength of 42 MPa and the second series of tests on the compression/shear test specimens assembled at 1100° C. give an average tensile strength of 8.5 MPa.

To obtain satisfactory mechanical properties of the brazed assemblies, it is thus necessary according to document [16] to use high brazing temperatures close to 1600° C. and particularly well above 1100° C.

Yet, it would be very interesting to carrying out brazing cycles in air with the system $SiO_2$—$Al_2O_3$—CaO, at a temperature below the temperatures implemented in document [16], and particularly at a temperature close to 1100° C., or even below 1100° C., because higher temperatures are not tolerated by certain materials such as composites. The properties of these composites are in fact degraded in an irreversible manner in particular above 1100° C., as is the case for example of the composite CERASEP® A40C consisting of a SiC matrix and SiC fibres.

There thus exists, in light of the above, a need for a method making it possible to carry out, in an oxidizing atmosphere and particularly in air, at a temperature below the temperatures implemented in document [16] and particularly at a temperature close to 1100° C., the brazing of parts made of silicon carbide based materials, whatever their shape and/or their size in order to obtain (despite the moderate brazing temperature used) an assembly having excellent mechanical strength and moderately refractory, in other words with a maximum operating temperature, temperature of use, above 500° C. and which can go up to 1250° C., preferably 850° C. to 1200° C., even more preferably 850° C. to 1000° C.

There exists in particular a need for a method of assembly by brazing making it possible to carry out in an oxidizing atmosphere, particularly in air, the moderately refractory brazing of silicon carbide based parts of large sizes and/or having complex geometries, having particularly large surfaces to be brazed.

There moreover exists a need for a method of assembly by brazing and for the associated brazing composition which assures both sealing of the joint between two parts made of silicon carbide based material, good filling of the joint by the brazing as well as satisfactory mechanical strength of the assembly above 500° C. and up to 850° C., or even 1250° C., according to the brazing composition.

In other words, there currently exists a non-satisfied need for a method of brazing and for the associated brazing composition, which makes it possible to form, between two SiC based materials, by brazing in an oxidizing atmosphere, particularly in air, and at a moderate temperature, strong, but also moderately refractory, bonds in other words being able particularly to withstand operating temperatures above 500° C., and able to go up to 850° C. and even above, in other words 1000° C. or even 1200° C. and even 1250° C.

None of the brazing methods and brazing compositions described in documents of the prior art and particularly in document [16] meet the needs enumerated above.

In particular, none of the methods and compositions of the prior art simultaneously fulfil the following criteria, highlighted by the inventors, and which are fundamental for forming structural components made of ceramic, such as SiC, involving moderately refractory joints:

1) the brazing composition must make it possible to form a strong bond between the two silicon carbide based parts, which implies a non-reactive brazing composition, in other words chemically compatible with silicon carbide, and which does not form fragile compounds therewith.

2) the brazing composition must fundamentally be compatible with an oxidizing brazing atmosphere consisting for example of a gas containing oxygen such as air or oxygenated argon and must not be degraded by it.

3) the brazing composition must wet the silicon carbide well and adhere well thereto.

4) the brazing composition must be compatible with all heating devices, particularly rapid and/or localised heating devices.

5) the brazing composition must have a coefficient of expansion suited to SiC, in other words close to the expansion coefficient thereof in order to eliminate any residual stress that could appear within the joint during cooling and to guarantee that there is no initiation of fissures, which would be detrimental to the mechanical strength of the assembly.

6) the brazing composition must consist of a limited number of elements in order to facilitate its preparation and its implementation.

7) the joint must be moderately refractory, in other words with a brazing temperature of 1050° C. to 1350° C., preferably close to 1100° C., enabling it to withstand operating temperatures generally above 500° C., for example 850° C.

to 1000° C. or even up to 1250° C., but while not being too refractory so as not to have a too high brazing temperature optionally capable of causing an oxidation of the composition in an oxidizing atmosphere and particularly in air, and while having excellent mechanical strength.

Finally, the method and the associated braze must enable the brazing, the assembly of any type of silicon carbide based material and must be able to be adapted easily to any specific silicon carbide based ceramic.

The goal of the invention is thus to provide a method of assembly by brazing of parts or components made of silicon carbide based materials that meets, among other things, the needs cited above, which satisfies, among other things, all of the aforementioned requirements and criteria, which eliminates the drawbacks, defects, limitations encountered with methods of the prior art, and which makes it possible particularly to form moderately refractory joints, with high toughness and exempt of fissuring not just during the elaboration of the joint but also in the operating conditions.

More specifically, the aim of the invention is to carry out brazing cycles in air with the system $SiO_2$—$Al_2O_3$—$CaO$ [16] at a temperature below the temperatures implemented in document [16] and preferably close to 1100° C., to obtain assemblies in which the mechanical strength is satisfactory and is at least equal to the mechanical strength of assemblies obtained at higher temperature, for example close to 1600° C., in document [16].

DESCRIPTION OF THE INVENTION

This goal and yet others are attained according to the invention by a method for assembling at least two parts made of silicon carbide based materials by non-reactive brazing in an oxidizing atmosphere, each of the parts comprising a surface to be assembled, wherein the parts are placed in contact with a non-reactive brazing composition, the assembly formed by the parts and the brazing composition is heated to a brazing temperature sufficient for completely or at least partially melting the brazing composition, or rendering the brazing composition viscous, and the parts and the brazing composition are cooled so as to form after the cooling of the latter to ambient temperature a moderately refractory joint; wherein the non-reactive brazing composition is a composition A consisting of silica ($SiO_2$), alumina ($Al_2O_3$), and calcium oxide (CaO), or a composition B, consisting of alumina ($Al_2O_3$), calcium oxide (CaO), and magnesium oxide (MgO), and wherein before heating the assembly formed by the parts and the brazing composition to the brazing temperature, a supply (addition) of non-oxidized silicon is carried out (in other words the silicon is not in the form of $SiO_x$ and particularly $SiO_2$, but instead in the form of elementary Si) on the surfaces to be assembled of the parts to be assembled and/or in the surface layers comprising the surfaces to be assembled of the parts to be assembled, and/or in the brazing composition.

The supply (addition) of silicon could thus be carried out both on the surfaces to be assembled of the parts, and in the surface layers comprising the surfaces to be assembled of the parts, and in the brazing composition.

To render the brazing composition viscous, a brazing temperature is used which is slightly below the melting point of the brazing composition.

Brazing temperature "slightly below the melting point of the brazing composition", is generally taken to mean that the brazing temperature may go up to 100° C. below the melting point.

The method according to the invention, which is a method of brazing in an oxidizing atmosphere, particularly in air, implementing a specific brazing composition consisting of three specific oxides (which is none other than the brazing composition described in document [16]), and wherein, prior to the brazing, a supply of silicon is carried out on the surfaces to be assembled of the parts to be assembled and/or in the surface layers comprising the surfaces to be assembled of the parts to be assembled, and/or in the brazing composition, has never been described in the prior art.

In particular, the fact of carrying out a supply of silicon, prior to brazing, on the surfaces to be assembled of the parts to be assembled and/or in the surface layers comprising the surfaces to be assembled of the parts to be assembled, and/or in the brazing composition is in no way mentioned or suggested in the documents of the prior art cited above and particularly in document [16].

In a surprising manner, by carrying out a supply of silicon and/or by enriching or by saturating the brazing composition with silicon, it is possible with the brazing compositions described in document [16] to carry out the brazing in an oxidizing atmosphere, particularly in air, of parts made of silicon carbide based materials at a brazing temperature below the brazing temperatures implemented in document [16], for example at a brazing temperature close to 1100° C., while obtaining satisfactory mechanical strength of the assembly, for example at least equal to the mechanical strength of assemblies obtained at higher temperature for example at around 1600° C. in document [16] (see the examples).

The method according to the invention responds to the needs, satisfies all of the aforementioned requirements and criteria and does not have the drawbacks of methods of the prior art and particularly the method that is the subject matter of document [16], cited above.

It may be said that the method according to the invention has all the advantages of the method described in document [16] linked to the fact that the method according to the invention implements the same brazing compositions A and B, but that it overcomes one of the major drawbacks by making it possible to obtain assemblies with high mechanical strength at a moderate brazing temperature, for example close to 1100° C., while analogous mechanical strength is only obtained, with the same brazing compositions, at very high temperature, around 1600° C., in document [16].

The method according to the invention thus makes it possible for the first time to form, by brazing, assemblies with high mechanical strength of parts made of materials such as composites, which do not withstand high temperatures, and the properties of which are degraded in an irreversible manner above 1100° C.

The method according to the invention enables the preparation in an oxidizing atmosphere, particularly in air, of moderately refractory assemblies (in other words with an operating temperature above 850° C., or even above 1000° C. and up to 1200° C., or even 1250° C.) of parts made of silicon carbide based materials, whatever their geometry, even very complex, and/or their size.

The method according to the invention assures in all cases, particularly, a good sealing of the joint, good filling of the joint by the brazing as well as excellent mechanical strength of the assembly above 500° C.

The method according to the invention is moreover simple, reliable, easy to implement and all in all not expensive.

In other words, the multiple advantages and surprising effects of the invention may be enumerated as follows, without this enumeration being considered as limiting:

- the assembly obtained according to the invention makes it possible to guarantee very good mechanical coupling between silicon carbide based substrates for maximum operating temperatures ranging for example from 850° C. to 1000° C. and up to 1250° C. according to the brazing composition, the composition of the brazing alloy. Ruptures occur in "cohesive" mode, in other words fissures occur in the silicon carbide based substrates and not at the interface.
- similarly, the brazed joints obtained according to the method are leak tight. The method is consequently suited for sealing operations that have to withstand maximum temperatures for example between 850° C. and 1200° C. according to the composition of the brazing alloy.
- extremely moderate reactivity of the brazing alloy on silicon carbide based substrates has been observed. There are no complex and porous weakened areas at the interface.
- another remarkable property of the method is the homogeneity of the joint obtained after brazing.
- the method according to the invention enables brazing in an oxidizing atmosphere and particularly in air, which greatly reduces the financial costs of the method compared to methods in which the brazing operation is carried out in a furnace in a protective atmosphere, for example argon, or in a secondary vacuum. The brazing temperature is not very high and does not exceed 1350° C.
- the method of brazing in an oxidizing atmosphere, particularly in air, according to the invention may also be carried out by resorting to a technique of rapid heating such as heating by induction and/or localised heating.

The oxidizing atmosphere is generally an atmosphere containing oxygen, such as an atmosphere of air, of oxygenated argon or of oxygenated helium (mixture of argon and oxygen or helium and oxygen).

The supply of silicon may be carried out by preparing a silicon coating on the surfaces to be assembled of the parts to be assembled.

A silicon coating is prepared on all the surfaces to be assembled of all the parts (two or more) to be assembled.

This coating may be prepared by a chemical vapour deposition (CVD) method, a physical vapour deposition (PVD) method, an electron beam physical vapour deposition (EBPVD) method, or by a liquid phase deposition method.

The supply of silicon may be carried out in the surface layers comprising the surfaces to be assembled of the parts, the surface layers consisting of silicon enriched SiC compared to the stoichiometry of SiC, or of pure silicon.

The supply of silicon may be carried out in the brazing composition.

The brazing composition may thus be enriched with non-oxidized silicon dissolved (in solution) at a concentration of non-oxidized dissolved silicon going up to the concentration corresponding to the saturation of the brazing composition with non-oxidized dissolved silicon.

Preferably, the brazing composition is enriched with non-oxidized silicon dissolved at a concentration that is close (generally to 1% to 2% by weight) to the concentration corresponding to saturation of the brazing composition with non-oxidized dissolved silicon but without nevertheless attaining the latter, or which is equal to the concentration corresponding to the saturation of the brazing composition with non-oxidized dissolved silicon.

It should be pointed out that, when saturation is spoken of, it means the maximum solubility of the non-oxidized silicon in the liquid glass at the elaboration temperature.

In fact, when the liquid glass in placed in contact with solid silicon, it is not possible to solubilise more silicon in the liquid glass than the maximum solubility.

The non-oxidized, dissolved silicon (not in $SiO_2$ form) content in the brazing composition enriched with non-oxidized dissolved silicon is generally 0.1% to 2.6% by weight (at the solubility limit), preferably more than 0.1% to 2.6% by weight, even more preferably 0.7% to 1.3% by weight, better 0.7% to 1% by weight compared to the total weight of the brazing composition and silicon.

Advantageously, composition A may consist, in weight percentages, of 75% to 7% of $SiO_2$, 60% to 6% of $Al_2O_3$ and 60% to 10% of CaO.

This advantageous range, this advantageous domain, of percentages by weights for composition A may be divided into three sub-domains no 1, no 2, and no 3.

In sub-domain no 1, composition A consists, in weight percentages, of 70% to 55% of $SiO_2$, 22% to 8% of $Al_2O_3$, and 35% to 15% of CaO.

The preferred compositions of this sub-domain no 1 of composition A are close to or correspond to the following composition: a composition consisting, in weight percentages, of 62% of $SiO_2$, 15% of $Al_2O_3$, and 23% of CaO.

In sub-domain no 2, composition A consists, in weight percentages, of 55% to 38% of $SiO_2$, 25% to 12% of $Al_2O_3$, and 45% to 30% of CaO.

The preferred compositions of this sub-domain no 2 of composition A are close to or correspond to the following composition: a composition consisting, in weight percentages, of 42% of $SiO_2$, 20% of $Al_2O_3$, and 38% of CaO.

In sub-domain no 3, composition A consists, in weight percentages, of 38% to 8% of $SiO_2$, 55% to 8% of $Al_2O_3$, and 55% to 28% of CaO.

The preferred compositions of this sub-domain no 3 of composition A are close to or correspond to the following composition: a composition consisting, in weight percentages, of 22% of $SiO_2$, 37% of $Al_2O_3$, and 41% of CaO.

Advantageously, composition B consists, in weight percentages, of 70% to 35% of $Al_2O_3$, 65% to 25% of CaO, and 20% to 1% of MgO.

The preferred compositions of this sub-domain of composition B are close to or correspond to the following composition: a composition consisting in weight percentages, of 50.5% of $Al_2O_3$, 44.0% of CaO, and 5.5% of MgO.

It is optionally possible to add titanium oxide $TiO_2$ to brazing compositions A or B used according to the invention, in particular to composition A.

Titanium oxide is generally added in an amount of 1% by weight to 10% by weight compared to the total weight of the brazing composition A or B as defined above, and of titanium oxide.

It is also optionally possible to add boron oxide $B_2O_3$ to the brazing compositions used according to the invention in order to lower the melting point thereof.

Boron oxide is generally added in an amount of 1% by weight to 10% by weight compared to the total weight of brazing composition A or B as defined above, and of boron oxide.

The addition of boron oxide makes it possible to lower the viscosity of the glass.

It is also optionally possible to add $CaF_2$ to the brazing compositions used according to the invention in order to lower the viscosity of the glass.

$CaF_2$ is generally added in an amount of 1% by weight to 10% by weight compared to the total weight of brazing composition A or B, and $CaF_2$.

The addition of $CaF_2$ makes it possible to lower the viscosity of the glass.

Advantageously in the method according to the invention, it is possible to form a brazing composition powder, said powder is suspended in an organic binder so as to obtain a brazing composition suspension or paste, and the brazing composition suspension or paste obtained is deposited on at least one surface of at least one of the parts to be assembled.

Thus, it is possible to coat a surface to be assembled of at least one of the parts to be assembled with the brazing composition suspension or paste, then place in contact the surfaces to be assembled of the parts so that the suspension or paste is intercalated (sandwiched) between them.

Or instead it is possible to place in contact the surfaces to be assembled of the parts to be assembled while observing an offset between them so as to create a free surface capable of receiving the suspension or paste near to the joint formed by the surfaces to be assembled of the parts to be assembled, then it is possible to deposit the suspension or paste on this free surface, for example in the form of a bead.

The brazing may be carried out a brazing temperature of 1050° C. to 1350° C., preferably 1100° C. to 1200° C., for a time of 1 to 240 minutes, preferably 10 to 120 minutes.

The brazing temperature must be below the temperature above which the SiC based material to be assembled is degraded.

The assembly formed by the parts and the brazing composition may be taken to the brazing temperature (plateau) by introducing it directly into a device, such as a furnace, already taken to the brazing temperature, or instead the assembly formed by the parts and the brazing composition is taken to the brazing temperature while observing a rise in temperature from ambient temperature.

The invention also relates to a brazing composition (moderately refractory, non-reactive) B, consisting of alumina ($Al_2O_3$), calcium oxide (CaO), and magnesium oxide (MgO), said brazing composition further comprising non-oxidized, dissolved silicon.

The brazing composition is preferably saturated with non-oxidized dissolved silicon.

Nevertheless, the method according to the invention may be implemented in a satisfactory manner even below the solubility limit and particularly a solubilisation of non-oxidized Si may be envisaged while remaining close to the limit of solubility.

The non-oxidized, dissolved silicon content (of the enriched or saturated brazing composition) is generally 0.1% to 2.6% by weight, preferably more than 0.1% by weight to 2.6% by weight, even more preferably 0.7% to 1.3% by weight, better 0.7% to 1% by weight compared to the total weight of the brazing composition as defined above and of silicon.

It should again be pointed out that when saturation is spoken of, it means the maximum solubility of silicon in the liquid glass (composition A or B) at the elaboration temperature.

In fact, when the liquid glass is placed in contact with solid silicon, it is not possible to solubilise in the liquid glass more silicon than the maximum solubility.

The invention also relates to the advantageous, preferred and specific brazing compositions defined by particular weight percentages of each of the oxides that have been described above when describing the method according to the invention, said brazing compositions further comprising silicon.

As has already been made clear above, titanium oxide, and/or boron oxide and/or $CaF_2$ may be added to the brazing composition according to the invention.

The invention also relates to a brazing composition suspension or paste comprising a brazing composition powder in suspension in an organic binder; said brazing composition being selected from a composition A consisting of silica ($SiO_2$), alumina ($Al_2O_3$), and calcium oxide (CaO) and a composition B consisting of alumina ($Al_2O_3$), calcium oxide (CaO), and magnesium oxide (MgO), said brazing composition further comprising non-oxidized, dissolved silicon.

The brazing compositions A and B included in this suspension have already been defined above.

In said suspension, titanium oxide, and/or boron oxide and/or $CaF_2$ may be added to the brazing composition.

The invention relates, moreover, to the moderately refractory joint, and to the assembly comprising at least two parts made of SiC based materials, capable of being obtained by the method according to the invention, described above.

Other characteristics and advantages of the invention will become clearer from reading the description that follows, given for illustrative and non-limiting purposes, with reference to the appended drawings.

On the X-axis is plotted the duration in minutes from the start of the thermal treatment, and on the Y-axis is plotted the temperature T in ° C.

Figure 6:
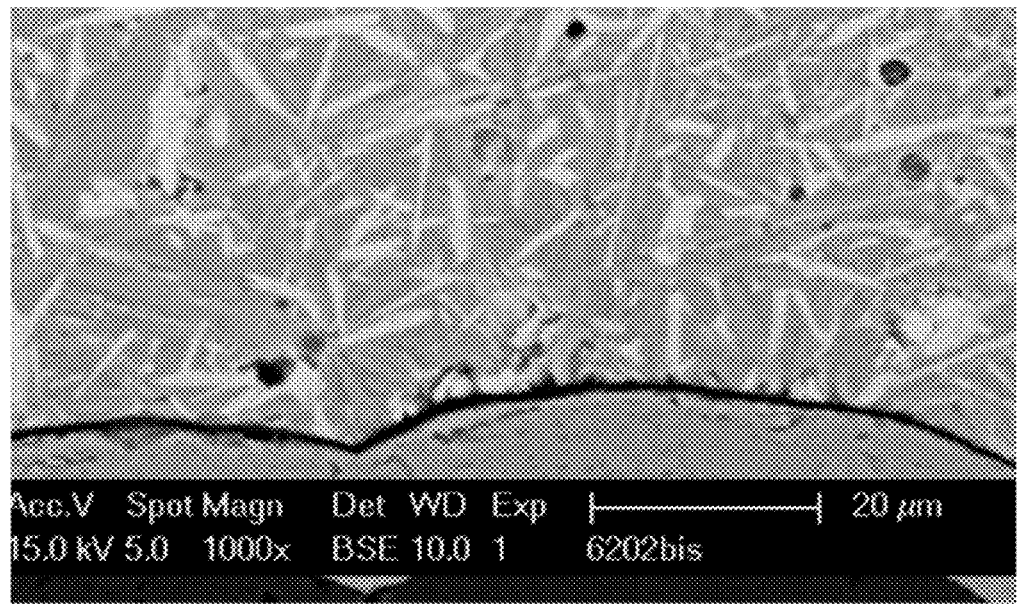

FIG. 6 is a photograph taken with a scanning electron microscope (SEM) of the interface of the glass-composite assembly of Lot A (Batch) formed in example 2.

The scale indicated in FIG. 6 represents 20 μm.

Figure 7:
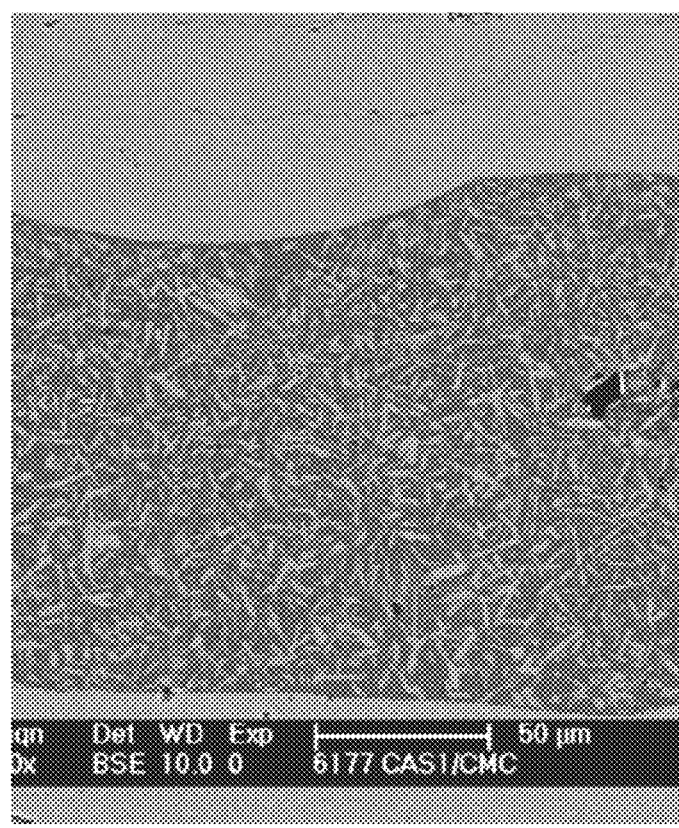

FIG. 7 is a photograph taken with a scanning electron microscope (SEM) of the interface of the glass-composite assembly of Lot B (Batch) formed in example 2.

The scale indicated in FIG. 7 represents 50 μm.

Figure 8:
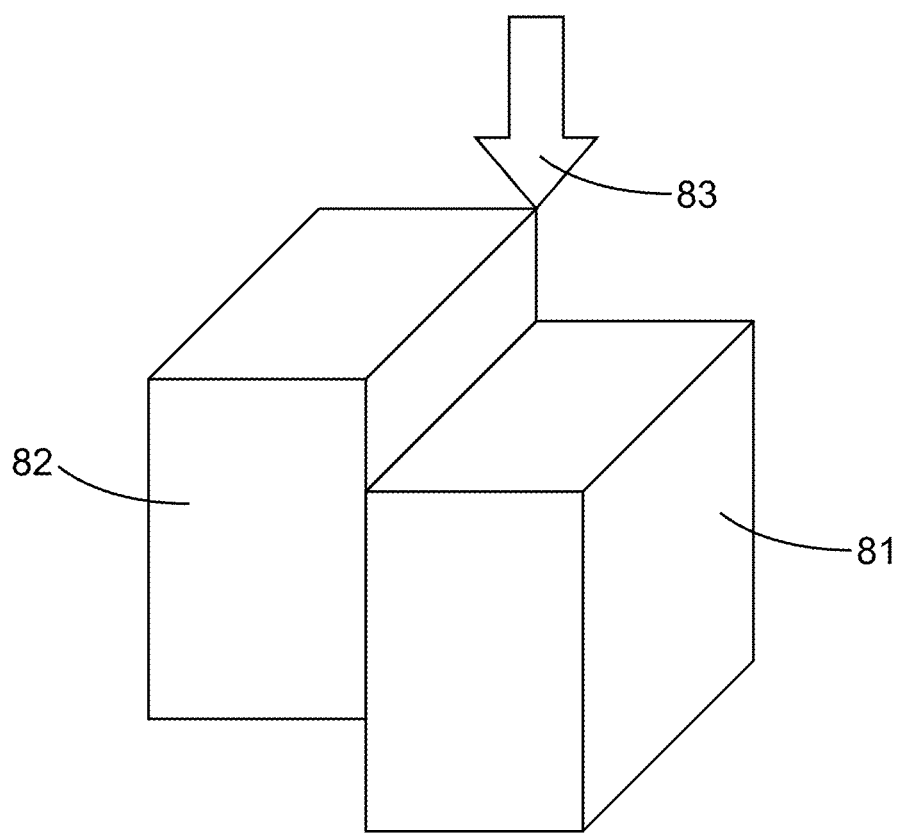

FIG. 8 is a schematic view of the test specimens used during a compression/shear test of the joints and assemblies prepared in examples 3, 4, and 5.

DETAILED DESCRIPTION OF PARTICULAR EMBODIMENTS

The first step of the method according to the invention consists, firstly, generally, in preparing, elaborating a brazing composition, in other words a brazing alloy, without added silicon, without input, supply, addition of silicon.

The brazing alloy according to the invention is a ternary alloy, either of the system silica ($SiO_2$)-alumina ($Al_2O_3$)-calcium oxide (CaO) (brazing composition A), or of the system alumina ($Al_2O_3$)-calcium oxide (CaO)-magnesium oxide (MgO) (brazing composition B). The preferred proportions by weight for each of compositions A and B have been mentioned above.

The brazing composition is, generally, a powdery composition that may be prepared, by synthesising, firstly, from different pure oxides and/or compounds consisting of several of said oxides a glass containing said oxides.

Examples of such compounds consisting of several oxides are mullite, which is the compound $3Al_2O_3 \cdot 2SiO_2$, the compound $CaO-Al_2O_3$, and the compound $CaO-SiO_2$.

These pure oxides or compounds are generally in the form of powders. They are weighed out while respecting the desired proportions in the final brazing composition that it is wished to obtain, then they are mixed and ground in any suitable apparatus, such as a mortar.

For an alloy of the system $SiO_2-Al_2O_3-CaO$, the braze is prepared either from powders of silica, mullite (compound defined $3Al_2O_3 \cdot 2SiO_2$) and powder of the compound $CaO-SiO_2$ (for example for composition A1), or from alumina powder and powder of the compound $CaO-SiO_2$ (for example for composition A2), or from powder of the compound $CaO-SiO_2$ and the compound $CaO-Al_2O_3$ (for example for composition A3).

For an alloy of the system $Al_2O_3-CaO-MgO$, the braze is prepared from CaO, MgO, $Al_2O_3$ and $CaO-Al_2O_3$ powders.

It is possible to improve the properties of the glasses of the system $SiO_2-Al_2O_3-CaO$ (brazing composition A) by making them crystallize by addition of titanium oxide $TiO_2$, which is a nucleation agent. Typically, several weight % of $TiO_2$ are added, for example 1% to 10% by weight of $TiO_2$ compared to the total weight of the brazing composition and $TiO_2$. On the other hand, glasses of the system $Al_2O_3-CaO-MgO$ generally crystallise without this addition.

It should also be noted that the melting temperature of these brazing alloys, whether it is brazing composition A or brazing composition B, may be reduced if necessary by addition of boron oxide $B_2O_3$, at a rate for example of 1% to 10% by weight of $B_2O_3$ compared to the total weight of the brazing composition and boron oxide, and/or by addition of $CaF_2$, at a rate for example of 1% to 10% by weight of $CaF_2$ compared to the total weight of the brazing composition and $CaF_2$.

Boron oxide and $CaF_2$ lower the viscosity of the glass forming the brazing composition, increase the rate of filling of the joints, particularly when the brazing is carried out in capillary configuration.

The mixture of ground powders is then introduced into a crucible generally made of platinum, and the different constituents of the mixture of powders are made to melt by subjecting them for example to a plateau of 4 hours in air at 1590° C. or 1640° C. according to the composition of the brazing alloy. After cooling, a homogeneous glass is obtained.

The glass obtained is recovered.

Two embodiments of the method according to the invention are then possible to form the assembly by brazing of parts made of silicon carbide based materials.

Each of these embodiments is defined by a different manner of carrying out the supply, addition, of silicon.

According to a first embodiment of the method according to the invention, the supply of silicon is carried out on the surfaces to be assembled of the parts to be assembled and/or in the surface layers comprising the surfaces to be assembled of the parts to be assembled.

The glass obtained as described above is ground in a mortar or any other suitable device to obtain a powder of suitable particle size, the grains of which, for example, have a diameter of 10 to 250 μm.

The ground glass, which thus constitutes the brazing composition powder, is then suspended in a conventional manner in a cement, binder, liquid organic gel, generally both viscous and sticky in order to obtain a brazing composition paste, suspension enabling homogeneous spreading on the surfaces of the silicon carbide based parts, substrates to be brazed.

The binder, cement, gel decomposes generally for example between 100° C. and 300° C. without leaving traces. It may for example be a cement of NICROBRAZ® type or a gel of VITTA® gel type.

The parts made of SiC based materials to be assembled are in general two in number, but a large number of parts that can extend up to 100 may also be assembled simultaneously.

Part made of SiC based materials is generally taken to mean any element, or entity of any shape or size entering for example, after assembly with one or more other parts, into structures of larger dimensions.

According to the invention, it is possible to assemble with each time excellent results parts of complex geometry, shape and/or large size, for example with 0.5 m² of surface to be brazed or more.

Silicon carbide based material is generally taken to mean here all materials comprising at least 50% by weight of silicon carbide, preferably at least 80% by weight of silicon carbide, even more preferably 100% by weight of silicon carbide, in the latter case the material consists of, is composed of, uniquely silicon carbide.

The materials made of silicon carbide may be particularly in the form of sintered or infiltrated powder or of fibres bound by a ceramic matrix.

The silicon carbide based materials may be selected from pure silicon carbides such as pure α (SiCα) or β (SiCβ) silicon carbide and SiC based composite materials such as composites with fibres and/or with silicon carbide matrix.

As examples of SiC based materials may be cited pure dense silicon carbide or pressureless sintered silicon carbide ("PLS-SiC"); Si infiltrated silicon carbide (known as SiSiC or RBSC containing 5 to 20% Si); porous recrystallized silicon carbide (known as RSiC); graphite silicon (C—SiC) consisting of graphite and covered with a layer of SiC for example 0.1 to 1 mm thickness; as well as SiC/SiC composites, for example, with fibres or with "whiskers"; SiC/SiC composites with self-healing matrix; C/SiC composites, for example, with carbon fibres or "whiskers" and with SiC matrix; and instead SiC monocrystals; and composites of SiC with another ceramic, for example, $SiC/Si_3N_4$ and SiC/TiN composites.

Preferably, the silicon based material of the substrates, parts to be assembled according to the invention consists of 100% silicon carbide, selected for example from grades of sintered pure α (SiCα) or β (SiCβ) silicon carbide or from SiC/SiC composites with a silicon carbide matrix and silicon carbide fibres like the composite Cerasep A40C® available from the firm Snecma Propulsion Solide.

It has been observed, in a surprising manner, that the method of the invention enables brazing of composites with excellent results.

In fact, the method according to the invention may be carried out at a moderate brazing temperature, close to 1100° C., which does not cause degradation of the composite materials, such as Cerasep A40C®, which do not tolerate higher temperatures.

The two or more parts to be assembled may be made of a same material, based on silicon carbide, for example PLS ("Pressureless Sintered")-SiC, or SiC—SiC composite or each of the parts may be made of a different material based on silicon carbide.

According to the first embodiment, the supply of silicon is carried out on the surfaces to be assembled of the parts to be assembled and/or in the surface layers comprising the surfaces to be assembled of the parts to be assembled.

Thus, the surfaces to be assembled of the (at least two) parts to be assembled could be coated with silicon.

The surfaces to be assembled of the parts to be assembled must be coated with silicon, but other surfaces of the parts to be assembled may optionally be coated.

This coating may be prepared by a chemical vapour deposition (CVD) method, a physical vapour deposition (PVD) method, an electron beam physical vapour deposition (EBPVD) method, or by a liquid phase deposition method.

This coating generally has a thickness of 0.5 to 10 µm; a thickness of around 1 µm is recommended.

The supply of silicon may also be carried out in surface layers comprising the surfaces to be assembled of the parts to be assembled, the surface layers consisting of silicon enriched SiC compared to the stoichiometry or of pure silicon.

"Silicon enriched" SiC compared to the stoichiometry is generally taken to mean that the silicon content is greater than 0.5% at. This surface layer generally has a thickness, depth of 1 to 150 µm.

Said supply of silicon may be carried out in surface layers comprising only the surfaces to be assembled of the parts to be assembled, but said supply of silicon may be carried out in surface layers further comprising the surfaces to be assembled of each of the parts to be assembled of other surfaces of the parts, or even all the external surfaces of the parts.

Thus, in the case of a SiC based composite material, the method for elaborating the composite is carried out so that the surface of the composite and several µm in depth in the composite is not stoichiometric SiC but silicon enriched SiC or pure silicon.

Among the methods making it possible to enrich with silicon the surface of a composite material, the chemical vapour infiltration (CVI) method or the liquid phase silicon infiltration method may be cited.

The parts in which, according to the invention, a supply of silicon has been carried out on the surfaces or in the surface layers to be assembled may then be assembled.

The second step of the method according to the invention consists generally in forming the assembly by actual brazing.

Prior to the assembly, the two (or more) surfaces of the parts made of SiC based materials to be assembled are generally degreased, cleaned, in an organic solvent for example of the ketone, ester, ether, alcohol type, or a mixture thereof.

A preferred solvent is acetone or an acetone-ethyl alcohol-ether mixture for example in the proportions 1/3, 1/3, 1/3; it is also possible to clean the parts successively with several different solvents, for example with acetone then ethanol. The parts are then dried.

The brazing composition suspension, paste prepared as has been described previously, is spread, coated, applied, preferably in a homogenous, uniform manner, for example with a brush, a spatula, a paint brush, or using a syringe potentially fixed to a robotized system, or using any other means making it possible to deposit a uniform layer of brazing paste on the surface of at least one of the parts made of silicon carbide based material to be assembled.

Figure 1:
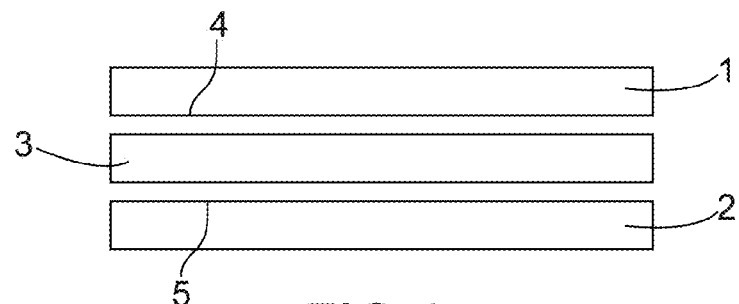
FIG. 1 is a schematic view showing the layout of the plates of SiC based material and of the brazing composition paste for brazing in "sandwich" configuration.

Then, the surface(s) coated with paste of the two parts (1, 2) to be assembled are placed in contact. This brazing configuration, illustrated in FIG. 1, is known as "sandwich configuration" because the brazing composition paste (3) is placed directly between the surfaces (4, 5) of the parts to be assembled.

The "sandwich" configuration applies equally well to "thin" joints, in other words of a thickness below 500 micrometers, as to "thick" joints, in other words a thickness greater than or equal to 500 micrometers.

The amount of brazing composition paste, suspension to implement in this configuration is generally 10 mg/cm$^2$ to 100 mg/cm$^2$, for example 50 mg/cm$^2$. This amount obviously depends on the joint thickness.

In an embodiment of the brazing in "sandwich configuration", the parts to be assembled, such as plates, are offset.

Thus, one begins by covering in a homogenous manner a surface to be assembled (21) of a first plate to be assembled (22) with the brazing paste (23) (FIG. 2), while leaving a free space (24) exempt of paste, for example in the form of a strip along one of the edges of the plate (22).

Figure 3:
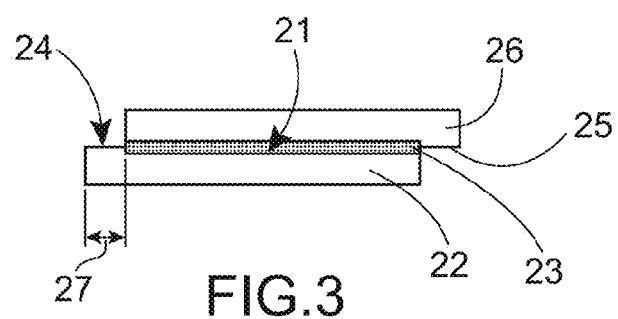
FIG. 3 is a schematic view showing the layout of plates of SiC based material and of the brazing composition paste for brazing in "sandwich" configuration with offset plates.

Then, the surface to be assembled (25) of a second plate to be assembled (26) is placed in contact with the paste deposited on the surface to be assembled (21) of the first plate (FIG. 3).

Due to the presence of free space not covered with paste on the surface of the first plate, the two composite plates are offset (27) whereas the brazing composition paste is intercalated between the surfaces to be assembled of the plates (22, 26).

Or instead the surfaces to be assembled of the parts to be assembled are brought together so as to leave between them an interval, generally 1 to 200 µm, which will be filled by capillarity effect by the brazing composition, the latter being arranged near to the interval to be filled in a space or reservoir fashioned for this purpose, said reservoir being able to have millimetric dimensions in accordance with the knowledge of the man skilled in the art in this field.

Figure 4:
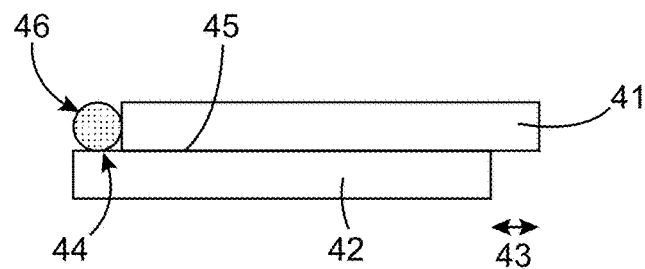
FIG. 4 is a schematic view showing the layout of plates of SiC based material and of the brazing composition paste for brazing in capillary configuration.

Thus, as is represented in FIG. 4, the surfaces to be assembled of the parts to be assembled, for example in the form of plates (41, 42), may be placed in contact, without having placed brazing composition between them and leaving an interval between them. Moreover, it is made sure that a gap, offset (43) exists between the parts, generally of several mm, for example 1 mm, 2 mm, to 10 mm so as to create a free surface (44) capable of receiving the suspension or paste near to the joint (45) formed by the surfaces to be assembled of the parts to be assembled, then the brazing composition suspension or paste is deposited for example in the form of a brazing bead (46) on this surface near to the joint, in the vicinity of the joint, or at the edge of the joint. During the thermal brazing cycle, the liquid brazing composition infiltrates into the joint.

This brazing configuration is known as "capillary configuration". With the brazing compositions according to the invention, it is possible to carry out such capillary brazing, namely an infiltration of the braze into the brazing joint, without arranging directly the brazing composition between the parts to be assembled as in the case of the "sandwich configuration".

In the case where it is chosen to carry out the brazing in capillary configuration, the addition of a compound such as $CaF_2$ or $B_2O_3$ may increase the speed of filling of the joints.

The amount of brazing composition paste, suspension to implement in this capillary configuration is generally 10 mg/cm² to 50 mg/cm², for example 20 mg/cm².

The parts ready to be brazed are then arranged in a heating device such as a furnace or subjected to heating by any other suitable means.

The furnace is a furnace operating in air, generally a furnace with alumina refractories.

According to the invention, the brazing is carried out in an oxidizing atmosphere such as an atmosphere containing oxygen, for example in an air atmosphere, and the heating device such as a furnace, for example, is in an oxidizing atmosphere such as an atmosphere containing oxygen, for example in an air atmosphere.

The parts to be assembled are subjected for example in the furnace to a thermal brazing cycle in an oxidizing atmosphere, particularly in air.

Thus the assembly formed by the parts and the brazing composition may be taken to the brazing temperature (brazing plateau) while observing a preferably "slow", rise in temperature, with one or more temperature ramp(s) from ambient temperature.

This temperature rise may be a slow temperature rise for example with a temperature ramp of 400° C./minute or a rapid temperature rise for example with a temperature ramp of 50° C./minute.

When a rapid temperature rise is carried out, the part is introduced into an already hot, preheated furnace.

The brazing plateau is realised at a temperature, which is the brazing temperature. This is in general at least 20° C. above the melting temperature, or liquidus temperature, of the chosen brazing composition.

According to the invention, the glass may enable the assembly with a plateau slightly below the melting point, domain where the glass is viscous and thus the brazing temperature may go from Tmelting (100° C.) to Tmelting+20° C. or even+50° C. or even 50° C.

The brazing temperature is moreover generally selected as a function of the temperature that the parts can withstand, and as a function of the temperature that it is possible to attain with the heating device.

The brazing temperature recommended according to the invention is thus, for example, 1050° C. to 1350° C., preferably 1100° C. to 1200° C.

Such a brazing temperature enables use of the assembly, particularly, in air for example up to 850° C. and even up to 1000° C., or even 1200° C. or 1250° C. and for certain brazing compositions and certain SiC based materials.

The duration of the brazing, in other words the thermal cycle for forming the assembly is, according to the invention, generally of short duration.

The duration of the brazing plateau is generally 10 to 120 minutes.

The duration of the brazing plateau depends on the brazing temperature, and it is typically 120 minutes for a temperature of 1100° C. and it may be reduced for higher brazing temperatures.

This duration may also be a little increased for very large parts with large surfaces to be brazed, namely typically at least 50×50 mm². In this case, the duration of the brazing plateau may extend up to 200 minutes, or even 240 minutes.

It is also possible to introduce directly, "rapidly" the parts to be assembled, ready to be brazed, in a device such as a furnace already taken to the temperature of the brazing plateau, generally 1050° C. to 1350° C. in order to reduce the duration of the thermal cycle.

At the end of the brazing cycle, following the brazing plateau, the assembly is cooled to ambient temperature at a rate for example of 5° C. to 6° C. per minute. This cooling is generally a "natural" cooling.

During the cooling, the brazing solidifies and the assembly of the parts made of silicon carbide based material is effective not just in the case where a "sandwich" configuration has been used but also in the case where a "capillary" configuration is used.

In a surprising manner, the assemblies of parts made of silicon carbide based materials brazed in air at moderate temperature (for example at 1100° C.), according to the first embodiment of the method according to the invention wherein a supply of silicon is provided on the surfaces to be assembled of the parts and/or in the surface layers comprising the surfaces to be assembled of the parts, have much better mechanical behaviour than assemblies brazed in air but without carrying out a supply of silicon, as demonstrated by the examples given hereafter (Examples 2, 4, and 5).

According to the second embodiment of the method according to the invention, a supply of silicon is carried out in the brazing composition.

The brazing composition may thus be enriched with non-oxidized dissolved (in solution) silicon up to the concentration corresponding to the saturation of the brazing composition with non-oxidized dissolved silicon.

Preferably, the brazing composition is enriched with non-oxidized dissolved silicon at a concentration which is close (namely 1% to 2% by weight) to the concentration corresponding to the saturation of the brazing composition with non-oxidized silicon but without nevertheless attaining the latter, or which is equal to the concentration corresponding to the saturation of the brazing composition with non-oxidized dissolved silicon.

In order to obtain this silicon saturation, it is possible for example to melt the glass obtained as described above (by melting of the constituents and cooling) at 1360° C. in argon in the presence of silicon for 6 hours.

It is possible to proceed in different ways to achieve this melting of the glass in argon in the presence of silicon leading to saturation of the glass:

either the glass is placed in a crucible made of silicon or coated with silicon. The assembly is placed in a furnace in argon and maintained at 1360° C. for 6 hours.

or the glass is placed in a crucible not reactive or very little reactive with the glass (for example silicon carbide or graphite) and a silicon stem is immersed into the liquid glass maintained at 1360° C. for 6 hours in argon.

In both cases, the glass may be poured out of its crucible to recover the glass without breaking the crucible. If the glass solidifies in its crucible, the latter risks being broken to recover the glass saturated with silicon.

or the glass is placed on silicon plates. The assembly is placed in a furnace in argon and maintained at 1360° C. for 6 hours. The glass may be cast in the liquid state to be recovered.

The glass saturated with silicon is ground in a mortar or any other suitable device to obtain a powder of suitable particle size, the grains of which have, for example, a diameter of 10 to 250 μm.

Then, all the steps of the method according to the invention in this second embodiment are then identical to the steps of the first embodiment described above.

Nevertheless, in this second embodiment, generally no silicon is provided on the surfaces to be assembled of the parts and/or in the surface layers comprising the surfaces to be assembled of the parts.

In a surprising manner, the assemblies of parts made of silicon carbide based materials brazed in air at moderate temperature (for example close to 1100° C.) according to the second embodiment of the method according to the invention, wherein silicon is provided in the brazing composition, have much better mechanical behaviour than assemblies brazed in air but without providing silicon, as demonstrated by the examples provided hereafter (Example 3).

The assemblies of parts made of silicon carbide comprising joints prepared by the method according to the invention make it possible to form structures, apparatuses, components of complex shapes having high operating temperatures, which can go generally up to 1000° C. or even 1250° C., with great precision.

It is known in fact that the mechanical properties of silicon carbide, namely:
great hardness;
low coefficient of expansion;
high breaking strength;
good resistance to thermal shock;
as well as its very good conductivity, make it a key material for present and future industrial applications at high temperature.

In addition, SiC has very good chemical resistance to various acids, including hydrofluoric acid and very good resistance to oxidation in air.

In other words, the method according to the invention may particularly apply to the manufacture of any device, apparatus, structure, component, requiring a moderately refractory assembly between at least two substrates, parts based on silicon carbide while guaranteeing both good mechanical strength and satisfactory sealing at the level of the assembly.

This type of device, apparatus, structure, component can meet needs in different fields:
the field of thermal engineering, particularly for designing high performance heat exchangers because silicon carbide has good thermal conductivity and good resistance at high temperatures in extreme environments.
the field of mechanical engineering for forming, in on-board devices, components that are light, rigid, refractory, abrasion resistant and resistant to mechanical stresses.
the field of chemical engineering, because silicon carbide is resistant to numerous corrosive chemicals for example like strong bases and acids.
the field of nuclear engineering for the production of fuel cladding.
the fields of space optics (SiC telescope mirrors) and aeronautics (SiC/SiC composite parts).
power electronics, which uses SiC or silicon.

The invention will now be described by means of the following examples obviously given for illustrative and non-limiting purposes.

EXAMPLES

Example 1

This example describes the preparation of a brazing composition, alloy consisting of a mixture of oxides of composition 62% by weight of $SiO_2$-15% by weight of $Al_2O_3$— and 23% by weight of CaO, and the saturation with silicon of a part of said mixture.

a) Preparation of the Brazing Composition.

The targeted brazing composition of 62% by weight of $SiO_2$-15% by weight of $Al_2O_3$-23% by weight of CaO is prepared from $SiO_2$ powder, mullite (compound defined as $3Al_2O_3$-$2SiO_2$) and the compound CaO—$SiO_2$.

These powders are weighed while respecting the proportions, then mixed and ground in a mortar. The powder mixture is then subjected to a plateau of 4 hours in air at 1590° C. After cooling, a glass is obtained. Analyses carried out by X-microprobe indicate that the mixture is homogenous and that the composition by weight is 61.2% $SiO_2$-15.0% $Al_2O_3$-23.4% CaO.

The glass obtained is recovered then crushed in a mortar.

A portion of the glass is conserved for the tests without saturation with silicon of the glass, it is noted Glass no 1, and the remainder of the glass is saturated with silicon according to the method described hereafter, and it is noted Glass no 2.

b) Saturation of the Mixture of Oxides with Silicon.

To saturate the mixture of oxides with silicon, it is placed in a silicon crucible.

Figure 5:
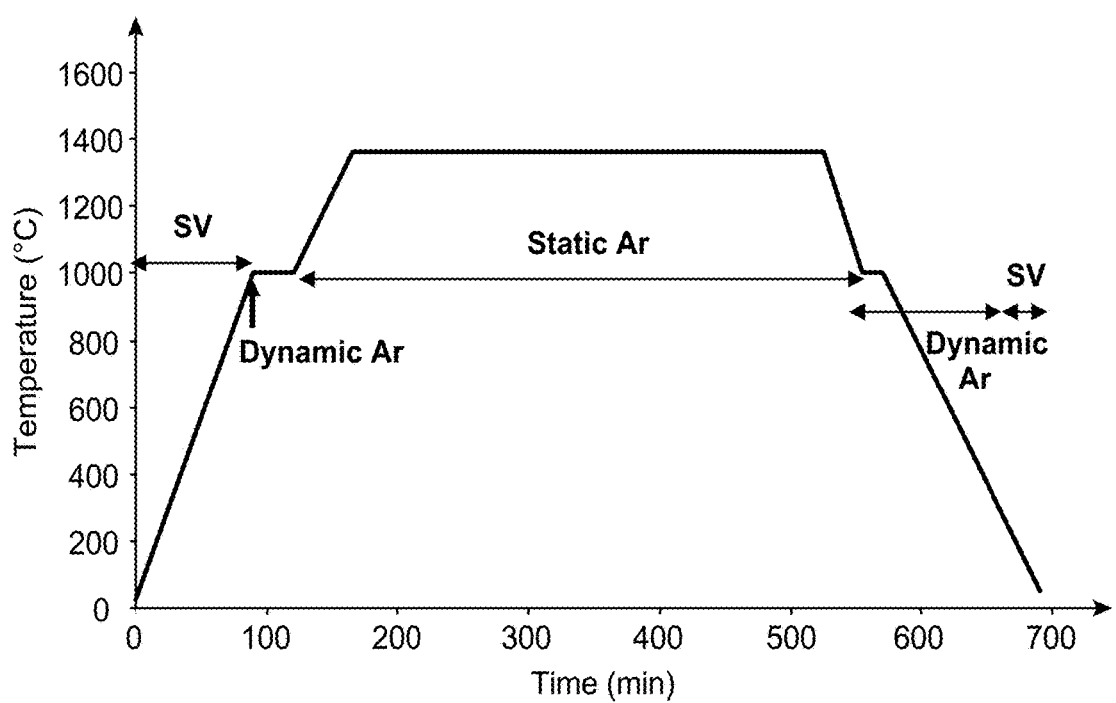
FIG. 5 is a graph that represents the brazing thermal cycle used in example 1 to saturate the mixture of oxides with silicon.

The assembly consisting of the silicon crucible and the mixture of oxides is placed in a metal furnace where it undergoes the thermal cycle represented in FIG. 5.

This thermal cycle comprises the following steps:
Rise in temperature from ambient temperature to 1000° C., in 90 minutes, in secondary vacuum;
Plateau at 1000° C., for 30 minutes, in dynamic argon;
Rise in temperature from 1000° C. to 1360° C., in 45 minutes in static argon;
Plateau at 1360° C., for 6 hours (360 minutes), in static argon;
Decrease in temperature from 1360° C. down to 1000° C., in 30 minutes, in static argon;
Plateau at 1000° C., for 15 minutes, in dynamic argon;
Decrease in temperature from 1000° C. down to ambient temperature, in 120 minutes in dynamic argon for 100 minutes, then in secondary vacuum.

At the end of the cycle, a glass saturated with silicon is recovered.

Microprobe analysis shows that the dissolved silicon content in the brazing is 1% by weight.

Example 2

This example is a comparative example that describes the preparation of composite/composite bonds, assemblies between two parts made of CeraSep A40C® composite material by implementing a brazing method (brazing in sandwich configuration) that uses a brazing composition consisting of 62% by weight of $SiO_2$-15% by weight of $Al_2O_3$ and 23% by weight of CaO.

On the one hand, an assembly is prepared between two parts made of CeraSep C® composite material belonging to a first lot (batch) designated lot A and, on the other hand, an assembly is prepared between two parts made of Cerasep A40C® composite material belonging to a second lot (batch) designated lot B.

The interfaces of the assemblies obtained respectively between the two parts made of composite material belonging to lot A and the two parts made of composite material belonging to lot B are then characterised and compared.

a) Composite Materials

Cerasep A40C® composite material is a SiC/SiC composite with a SiC matrix and SiC fibres. Such a material is available from the firm Snecma Propulsion Solide (Groupe Safran). Two different lots, designated lot A and lot B, have been elaborated and exhibit differences in terms of surface chemistry.

Lot A is the reference in terms of stoichiometry, it is coated with a deposition of stoichiometric SiC (also known as "seal coat").

Lot B has been modified and the deposition of SiC is not stoichiometric but silicon enriched, of composition 75 at. % Si-25 at. % C, the thickness of the deposition is of the order of 150 µm.

b) Preparation of the Brazing Composition and of the Parts to be Assembled.

The glass is elaborated according to the procedure described in example 1.

According to the notation specified in example 1, it is glass no 1, not saturated with silicon, which is used.

Then, it is recovered, then ground in a mortar. Then it is mixed with NICROBRAZ® organic cement, which is both viscous and sticky, in order to obtain an easy to spread paste.

The parts made of composite material are plates of dimensions 25×25 mm$^2$ and of thickness 1.5.

The two surfaces made of composite material to be assembled are degreased in an organic solvent, then dried.

The paste is spread in a uniform manner on the surface of one of the substrates, parts made of composite material to be assembled.

The amount placed on the 2 cm$^2$ of surface to be assembled during this test is of the order of 50 mg/cm$^2$.

Then, the substrates, parts are placed in contact (this configuration is known as sandwich configuration).

c) Brazing.

The parts, placed in contact and thus ready to be brazed, are placed in a furnace and subjected to a thermal cycle of brazing in air.

The cycle comprises a temperature rise ramp from ambient temperature up to 1100° C. at a rate of 400° C./h, then a plateau of 120 minutes at 1100° C. followed by natural cooling.

d) Characterisation of the Composite Material/Glass Interfaces.

The interfaces of the assemblies obtained are characterised by observing them with a scanning electron microscope (SEM).

The assembly formed with lot A leads to a discontinuous interface between the glass and the composite, which is characteristic of a lack of adherence (FIG. 6). On the other hand, with lot B, a continuous interface is observed (FIG. 7).

The silicon enrichment, according to the invention, of the surface of lot B has enabled better adherence.

Example 3

This example describes the preparation of bonds, assemblies between two parts made of CeraSep A40C® composite material, and between two parts made of pure sintered a silicon carbide SiC, by implementing a method of brazing (brazing in sandwich configuration) which uses a brazing composition consisting of 62% by weight of SiO$_2$-15% by weight of Al$_2$O$_3$ and 23% by weight of CaO not saturated with silicon or the same brazing composition but saturated with silicon.

This example moreover describes tests, mechanical tests carried out on these assemblies in order to compare the mechanical behaviour thereof.

a) The Composite Material, and Pure Sintered α SiC.

The composite material selected in this example 3 is the composite Cerasep A40C® (already described above in example 2, paragraph a)).

The lot selected in this example 3 is lot A, in other words the reference in terms of stoichiometry (stoichiometric SiC).

The pure sintered α SiC is alpha SiC (Hexyloy® of St Gobain).

b) Preparation of the Brazing Composition and the Parts to be Assembled.

Glass no 1 not saturated with silicon, and glass no 2 saturated with silicon have been elaborated as described in example 1.

Each of the glasses is recovered, then ground in a mortar. Then it is mixed, as in example 2, with NICROBRAZ® organic cement, which is both viscous and sticky, in order to obtain an easy to spread paste.

The parts made of composite and sintered SiC are plates of dimensions 20×10 mm$^2$ and of thickness 1.5 mm.

The parts are cleaned with acetone, then with ethanol and finally dried.

Figure 2:
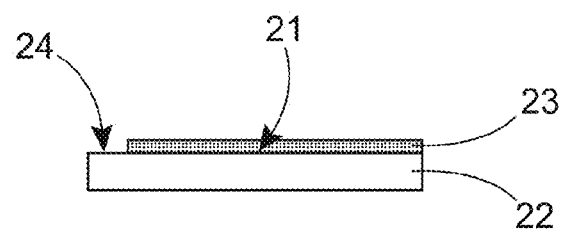
FIG. 2 is a schematic view which shows a plate of SiC based material covered on one of its faces with a brazing composition paste with a view to a brazing in "sandwich" configuration with offset plates.

The paste is spread in a uniform manner on the surface of one of the substrates, parts to be assembled while leaving free a strip of around 2 mm from the edge of the part (in the sense of the width=10 mm) as is indicated in FIG. 2. The amount deposited is:

- comprised between 30 and 50 mg for the plate made of sintered SiC;
- comprised between 90 and 110 mg for the plate made of composite material. In fact, the joint being thicker on account of the surface state of the composite material, the amount of brazing required to fill the joint is greater than for sintered SiC.

Then the substrates, parts are placed in contact (FIG. 3) with an offset of 2 mm (this configuration is known as sandwich configuration).

c) Brazing.

The parts placed in contact and ready to be brazed are placed in a furnace and subjected to a thermal cycle of brazing in air.

The cycle comprises a temperature rise ramp from ambient temperature up to 1100° C. at a rate of 400° C./h, then a plateau of 120 minutes at 1100° C. followed by natural cooling.

The following assemblies, following test specimens have thus been prepared:

- SiC test specimens assembled with glass no 1 not saturated with Si.
- 2 SiC test specimens assembled with glass no 2 saturated with Si.
- 2 composite test specimens with glass no 1 not saturated with Si.
- 2 composite test specimens with glass no 2 saturated with Si.

d) Mechanical Tests.

The mechanical tests are carried out with the test specimens of mechanical tests prepared in c) by brazing of 2 parts each of dimensions 20×10×1.5 mm$^3$ (the thickness of the brazed test specimen is thus 1.5+1.5=3 mm) (81, 82).

In fact, the mechanics of ceramics being statistical, with a view to the tests more than one test specimen is prepared but with the same manufacturing method.

The test specimens are shown schematically in FIG. 8. They are fixed in a mounting and subjected to shear during a compression/shear test (83) at ambient temperature.

It should be noted that this test does not make it possible to guarantee pure shear but it is the preferential mode. This test makes it possible however to compare the assemblies with each other.

Results of Mechanical Tests:

The average tensile strengths determined for these test specimens are given in table 1 as well as the type of rupture: adhesive (at the interface), cohesive (within the SiC substrate or within the composite material or in the "seal coat" of the composite material), or mixed (intermediate between the 2 modes).

TABLE 1

Tensile strength and mode of rupture for the compression/shear tested test specimens.

| Glass | Sintered SiC | | Cerasep A40C ® composite | |
|---|---|---|---|---|
| | Tensile strength (MPa) | Type of rupture | Tensile strength (MPa) | Type of rupture |
| Glass no 1 non saturated | 6 | adhesive | 6 | adhesive |
| Glass no 2 saturated | 14 | mixed | 10 | Cohesive, pull off (stripping) of the seal coat of the composite |

It should be noted that silicon enrichment of the glass makes the mode of rupture change from adhesive (rupture at the interface) to a mixed mode of rupture (rupture within the substrate and in the joint) or cohesive (rupture within the substrate): this is the case of the composite with pull off of the SiC "seal coat".

Example 4

This example describes the preparation of bonds, assemblies between two parts made of CeraSep A40C® composite material (lot B), by implementing the brazing method according to the invention—the brazing being carried out in "sandwich configuration"—and using a brazing composition consisting of 62% by weight of $SiO_2$-15% by weight of $Al_2O_3$ and 23% by weight of CaO, not saturated with silicon.

This example moreover describes tests, mechanical tests carried out on these assemblies in order to study the mechanical behaviour thereof.

a) The Composite Material.

The composite material selected in this example 4 is the composite Cerasep A40C® (already described above in example 2, paragraph a)).

The lot selected in this example 4 is lot B, in other words that the deposition of SIC of the "seal coat" is not stoichiometric but silicon enriched. The deposition is of composition 75 at. % Si-25 at. % C, and the thickness of the deposition is of the order of 150 μm.

This deposition of silicon enriched SiC has been carried out by "CVI" for the phase of elaboration of the composite.

b) Preparation of the Brazing Composition and the Parts to be Assembled.

Glass no 1 not saturated with silicon has been elaborated as described in example 1.

The glass is recovered, then ground in a mortar. Then it is mixed as in example 2, with NICROBRAZ® organic cement, which is both viscous and sticky, in order to obtain an easy to spread paste.

The parts made of composite and made of sintered SiC are plates of dimensions 20×10 mm² and of thickness 1.5 mm.

The parts are cleaned with acetone, then with ethanol and finally dried.

The paste is spread in a uniform manner on the surface of one of the substrates, parts to be assembled while leaving free a strip of around 2 mm from the edge of the part (in the sense of the width) as is indicated in FIG. 2. The amount deposited is comprised between 90 and 110 mg for the plate made of composite material.

Then the substrates, parts are placed in contact with an offset of 2 mm (this configuration is known as sandwich configuration: FIG. 3).

c) Brazing.

The parts placed in contact and ready to be brazed are placed in a furnace and subjected to a thermal cycle of brazing in air.

The cycle comprises a temperature rise ramp from ambient temperature up to 1100° C. at a rate of 400° C./h, then a plateau of 120 minutes at 1100° C. followed by natural cooling.

Three assemblies, test specimens have thus been manufactured.

d) Mechanical Tests.

The mechanical tests are carried out with the test specimens of mechanical tests prepared in c) by brazing of 2 parts each of dimensions 20×10×1.5 mm³ (the thickness of the brazed test specimen is thus 1.5+1.5=3 mm) (81, 82).

The test specimens are shown schematically in FIG. 8. They are fixed in a mounting and subjected to shear during a compression/shear test (83) at ambient temperature.

Results of Mechanical Tests:

The average tensile strengths determined for these three test specimens are 12 MPa.

The type of rupture is mixed with rupture in the "seal coat" and in the joint.

It should be noted that silicon enrichment of the surface of the composite makes it go from an adhesive mode of rupture (rupture at the interface) to a mixed mode of rupture (rupture in the "seal coat" and in the joint).

Example 5

This example describes the preparation of bonds, assemblies, between two parts made of CeraSep A40C® composite material (lot A) coated with a deposition of silicon of a thickness of 1 μm, and between two parts made of CeraSep A40C® composite material (lot A), while implementing a brazing method (brazing in sandwich configuration) which uses a brazing composition consisting of 62% by weight of $SiO_2$-15% by weight of $Al_2O_3$ and 23% by weight of CaO not saturated with silicon.

This example moreover describes tests, mechanical tests carried out on these assemblies in order to study the mechanical behaviour thereof.

a) The Composite Material.

The composite material is Cerasep A40® coated with silicon.

The composite material selected in this example 5 is the composite Cerasep A40C® (already described above in example 2, paragraph a)).

The lot selected in this example 5 is lot A, in other words the reference in terms of stoichiometry (stoichiometric SiC).

This composite material has been coated with a deposition of silicon of a thickness of 1 μm by the electron beam physical vapour deposition method.

b) Preparation of the Brazing Composition and the Parts to be Assembled.

The targeted brazing composition of 62% by weight of $SiO_2$-15% by weight of $Al_2O_3$-23% by weight of CaO has been prepared from $SiO_2$ powder (1.412 g), mullite (compound defined as $3Al_2O_3\text{-}2SiO_2$) (0.940 g), the compound CaO—$SiO_2$ (2.142 g), and $B_2O_3$ powder (0.500 g).

These powders are weighed while respecting the proportions, then mixed and ground in a mortar.

The mixture of powder is then subjected to a plateau of 4 hours in air at 1590° C. After cooling, glass is obtained.

The glass obtained is recovered then crushed in a mortar.

The glass thereby elaborated is then mixed as in example 2 with NICROBRAZ® organic cement, which is both viscous and sticky, in order to obtain an easy to spread paste.

The parts made of composite are plates of dimensions 20×10 mm² and of thickness 1.5 mm. They have been coated with a layer of 1 μm of silicon by the electron beam physical vapour deposition method.

The plates made of composite material are cleaned with acetone, then with ethanol and finally dried.

The paste is spread in a uniform manner on the surface of one of the substrates, parts to be assembled while leaving free a strip of around 2 mm from the edge of the part (in the sense of the width) as is indicated in FIG. 2.

The amount deposited is comprised between 90 and 110 mg.

Then the substrates, parts are placed in contact with an offset of 2 mm (this configuration is known as sandwich configuration—FIG. 3).

c) Brazing.

The parts placed in contact and ready to be brazed are placed in a furnace and subjected to a thermal cycle of brazing in air.

The cycle comprises a temperature rise ramp from ambient temperature up to 1100° C. at a rate of 400° C./h, then a plateau of 120 minutes at 1100° C. followed by natural cooling.

Two test specimens have thus been manufactured.

d) Two other test specimens have been manufactured exactly in the same way as in paragraphs a) to c) of example 5 with the sole difference that the parts, substrates are made of Cerasep A40© composite material but without silicon coating.

e) Mechanical Tests.

The mechanical tests are carried out with the test specimens of mechanical tests prepared in c) and in d) by brazing of 2 parts each of dimensions 20×10×1.5 mm³ (the thickness of the brazed test specimen is thus 1.5+1.5=3 mm) (81, 82).

The test specimens are shown schematically in FIG. 8. They are fixed in a mounting and subjected to shear during a compression/shear test (83) at ambient temperature.

Results of Mechanical Tests:

The tensile strengths determined for these 4 test specimens are given in table 2 as well as the type of rupture.

TABLE 2

Tensile strength and mode of rupture for the test specimens tested for compression/shear in the case of the composite CeraSep A40C ® with and without Si coating.

| Glass | Cerasep A40C ® composite without Si coating | | Cerasep A40C ® composite with Si coating | |
|---|---|---|---|---|
| | Tensile strength (MPa) | Type of rupture | Tensile strength (MPa) | Type of rupture |
| Non saturated glass | 1-4 | Adhesive | 13-19 | Cohesive, pull off of the seal coat |

It should be noted that silicon enrichment of the surface of the composite material makes the mode of rupture change from adhesive (rupture at the interface) to a cohesive mode of rupture (rupture within the substrate): this is the case of the composite material with pull off (stripping) of the SiC "seal coat".

REFERENCES

[1] Hanson W. B., Fernie J. A., Ironside K. I., Ormston D. R., Knowles K. M., *Active metal brazing: the role of the braze alloy*, Proceedings from materials solutions '99 on joining of advanced and specialty materials, p. 53, 1999.

[2] Fernie J. A., Hanson W. B., Ormston D. R., Knowles K. M., *Ceramic reinforced Metal braze alloys for joining silicon carbide*, British ceramic proceedings, no 60, p. 317, 1999.

[3] Prakash P., Mohandas T., Dharma Raju P., *Microstructural characterisation of SiC ceramic and SiC-metal active metal brazed joints*, Scripta materialia 52, p. 1169, 2005.

[4] Gasse A., Coing-Boyat G., Bourgeois G., Method using a thick joint for joining parts in SiC-based materials by refractory brazing and refractory thick joint thus obtained, brevet U.S. Pat. No. 5,975,407, 1999.

[5] Montgomery F. C., Streckert H. H., Braze for Silicon Carbide bodies, brevet U.S. Pat. No. 5,447,683, 1995

[6] Gasse A., Method for assembling parts made of materials based on SiC by non-reactive refractory brazing, brazing composition, and joint and assembly obtained by said method, US-A1-2003/0038166.

[7] Lemoine P., Ferraris M., Salvo M, Appendino Montorsi M., *Vitreous Joining Process of SiC$_f$/SiC Composites*, Journal of the European Ceramic Society 22, p. 2343, 2002.

[8] Ferraris M., Salvo M., Isola C., Appendino Montorsi M., Kohyama A., *Glass-ceramic joining and coating of SiC/SiC for fusion applications*, Journal of Nuclear Materials 258-263, p. 1546, 1998.

[9] Katoh Y., Kotani M., Kohyama A., Montorsi M., Salvo. M, Ferraris M., *Microstructure and mechanical properties of low-activation glass-ceramic joining and coating for SiC/SiC composites*, Journal of Nuclear Materials 283-287, p. 1262, 2000.

[10] Drouet C., Minjolle L., Matériaux céramiques vitreux, procédé fabrication de tels matériaux et application de ces derniers au collage de pièces céramiques, FR-A-2 538 370, 1982.

[11] Perham T. J., De Jonghe L. C., MoberlyChan W. J., *Joining of silicon carbide with a cordierite glass-ceramic*, Journal of the European Ceramic Society 82, p. 297, 1999.

[12] Tamari N., Honda M., Ebata Y., Kinoshita M., *Joining of silicon carbide with $Si_3N_4$—$Y_2O_3$-$La_2O_3$—MgO Mixture*, Yogyo-Kyokai-Shi 94 [10], p. 1087, 1986

[13] Lee H. L., Nam S. W., Hahn B. S., *Joining of silicon carbide using MgO—$Al_2O_3$—$SiO_2$ filler*, Journal of Materials Science 33, p. 5007, 1998.

[14] Lippmann W., Knorr J., Wolf R., Rasper R., Exner H., Reinecke A. M., Nieher M., Schreiber R., *Laser Joining of silicon—a new technology for ultra-high temperature*, Nuclear Engineering and Design 33, p. 5007, 1998.

[15] Knorr J., Lippmann W., Wolf R., Exner H., Reinecke A-M., Method for producing by laser gastight and high-temperature resistant connections of shaped parts made of non-oxidic ceramic, US-A1-2005/0167409.

[16] Mailliart O., Chaumat. V., Hodaj F., Procédé d'assemblage moyennement réfractaire de pièces en matériaux à base de SiC par brasage non réactif sous atmosphère oxydante, composition de brasure, et joint et assemblage obtenus par ce procédé, FR-A1-2935376.

The invention claimed is:

1. Method for assembling at least two parts made of silicon carbide based materials by non-reactive brazing in an oxidizing atmosphere, each of the parts comprising a surface to be assembled,
   wherein the parts are placed in contact with a non-reactive brazing composition to form an assembly,
   the assembly formed by the parts and the brazing composition is heated to a brazing temperature sufficient for completely or at least partially melting the brazing composition, or rendering the brazing composition viscous,
   and the parts and the brazing composition are cooled so as to form after the cooling of the latter to ambient temperature a moderately refractory joint;
   wherein the non-reactive brazing composition is a composition A consisting of silica ($SiO_2$), alumina ($Al_2O_3$), and calcium oxide (CaO), and, optionally, titanium oxide, boron oxide and/or $CaF_2$, or a composition B, consisting of alumina ($Al_2O_3$), calcium oxide (CaO), and magnesium oxide (MgO), and, optionally, titanium oxide, boron oxide and/or $CaF_2$, and
   wherein, before heating the assembly formed by the parts and the brazing composition to the brazing temperature, a supply of silicon in a non-oxidized form is carried out on the surfaces to be assembled of the parts to be assembled and/or a supply of silicon in a non-oxidized form is carried out in surface layers comprising the surfaces to be assembled of the parts to be assembled to form surface layers consisting of said silicon carbide based materials enriched with Si, and/or a supply of silicon in a non-oxidized form is added to the brazing composition.

2. Method according to claim 1, wherein the oxidizing atmosphere is an atmosphere containing oxygen.

3. Method according to claim 1, wherein the supply of silicon is carried out by preparing a silicon coating on the surfaces to be assembled of the parts.

4. Method according to claim 3, wherein the silicon coating is prepared by a chemical vapour deposition (CVD) method, a physical vapour deposition (PVD) method, an electron beam physical vapour deposition (EBPVD) method, or by a liquid phase deposition method.

5. Method according to claim 1, wherein the supply of silicon is carried out in the surface layers comprising the surfaces to be assembled of the parts, the surface layers consisting of silicon enriched SiC compared to the SiC stoichiometry, or of pure silicon.

6. Method according to claim 1, wherein the supply of non-oxidized silicon is carried out in added to the brazing composition.

7. Method according to claim 6, wherein the brazing composition is enriched with non-oxidized silicon dissolved at a concentration of non-oxidized dissolved silicon extending up to the concentration corresponding to the saturation of the brazing composition in non-oxidized dissolved silicon.

8. Method according to claim 7, wherein the brazing composition is enriched with non-oxidized dissolved silicon at a concentration that is close to the concentration corresponding to the saturation of the brazing composition in non-oxidized dissolved silicon but without nevertheless attaining the latter, or which is equal to the concentration corresponding to the saturation of the brazing composition in non-oxidized dissolved silicon, wherein the non-oxidized dissolved silicon content of the brazing composition enriched with non-oxidized dissolved silicon is 0.1% to 2.6% by weight, compared to the total weight of the brazing composition and silicon.

9. Method according to claim 1, wherein composition A consists, in weight percentages, of 75% to 7% of $SiO_2$, 60% to 6% of $Al_2O_3$ and 60% to 10% of CaO.

10. Method according to claim 9, wherein composition A consists, in weight percentages, of 70% to 55% of $SiO_2$, 22% to 8% of $Al_2O_3$, and 35% to 15% of CaO.

11. Method according to claim 10, wherein composition A consists, in weight percentages, of 62% of $SiO_2$, 15% of $Al_2O_3$, and 23% of CaO.

12. Method according to claim 9, wherein composition A consists, in weight percentages, of 55% to 38% of $SiO_2$, 25% to 12% of $Al_2O_3$, and 45% to 30% of CaO.

13. Method according to claim 12, wherein composition A consists, in weight percentages, of 42% of $SiO_2$, 20% of $Al_2O_3$, and 38% of CaO.

14. Method according to claim 9, wherein composition A consists, in weight percentages, of 38% to 8% of $SiO_2$, 55% to 8% of $Al_2O_3$, and 55% to 28% of CaO.

15. Method according to claim 14, wherein composition A consists, in weight percentages, of 22% of $SiO_2$, 37% of $Al_2O_3$, and 41% of CaO.

16. Method according to claim 1, wherein composition B consists, in weight percentages, of 70% to 35% of $Al_2O_3$, 65% to 25% of CaO, and 20% to 1% of MgO.

17. Method according to claim 16, wherein composition B consists, in weight percentages, of 50.5% of $Al_2O_3$, 44.0% of CaO, and 5.5% of MgO.

18. Method according to claim 1, wherein titanium oxide is added to the brazing composition.

19. Method according to claim 1, wherein boron oxide is added to the brazing composition.

20. Method according to claim 1, wherein $CaF_2$ is added to the brazing composition.

21. Method according to claim 1, wherein a powder of brazing composition is formed, said powder is suspended in an organic binder in order to obtain a brazing composition suspension or paste, and the brazing composition suspension or paste obtained is deposited on at least one surface of at least one of the parts to be assembled.

22. Method according to claim 21, wherein a surface to be assembled of at least one of the parts to be assembled is coated with the brazing composition suspension or paste, then the surfaces to be assembled of the parts are placed in contact so that the suspension or paste is intercalated between them.

23. Method according to claim 21, wherein the parts to be assembled are placed in contact while observing an offset between them so as to create a free surface capable of receiving the suspension or paste near to the joint formed by the surfaces to be assembled of the parts to be assembled, then the suspension or paste is deposited on said free surface.

24. Method according to claim 1, wherein the brazing is carried out at a brazing temperature of 1050° C. to 1350° C., for a duration of 1 to 240 minutes.

25. Method according to claim 1, wherein the assembly formed by the parts and the brazing composition is taken to the brazing temperature by introducing it directly into a device already taken to the brazing temperature.

26. Method according to claim 1, wherein the assembly formed by the parts and the brazing composition is taken to the brazing temperature while observing a rise in temperature from ambient temperature.

27. Method according to claim 1, wherein the silicon carbide based materials are selected from the group consisting of pure silicon carbides and composite SiC based materials.

28. Method according to claim 1, wherein the silicon carbide based materials are selected from the group consisting of pressureless sintered silicon carbide ("PLS SiC"); Si infiltrated silicon carbide ("SiSiC" or "RBSC"); recrystallized porous silicon carbide ("RSiC"); silicon graphite ("C SiC") consisting of graphite and covered with a layer of SiC; SiC/SiC composites; SiC/SiC composites with self-healing matrix; C/SiC composites; monocrystals of SiC; composites of SiC with another ceramic; and SiC/TiN composites.

29. Method according to claim 1, wherein said silicon carbide based materials have a silicon carbide content at least equal to 50% by weight.

30. Method according to claim 1, wherein the parts to be assembled are formed from the silicon carbide based materials prior to carrying out the supply of silicon in a non-oxidized form on the surfaces to be assembled of the parts to be assembled and/or in the surface layers comprising the surfaces to be assembled of the parts to be assembled.

31. Method according to claim 1, wherein the surface layers consisting of silicon enriched silicon carbide have thickness of 1 to 150 μm.

32. Method for assembling at least two parts made of silicon carbide based materials by non-reactive brazing in an oxidizing atmosphere, each of the parts comprising a surface to be assembled, said method comprising providing the at least two parts made of silicon carbide based materials, placing the at least two parts in contact with a non-reactive brazing composition to form an assembly, heating the assembly formed by the parts and the brazing composition to a brazing temperature sufficient for completely or at least partially melting the brazing composition, or rendering the brazing composition viscous, and cooling the assembly formed by the parts and the brazing composition to form, after the cooling of the brazing composition to ambient temperature, a moderately refractory joint;

wherein the non-reactive brazing composition is a composition A consisting of silica ($SiO_2$), alumina ($Al_2O_3$), and calcium oxide (CaO), and, optionally, titanium oxide, boron oxide and/or $CaF_2$, or a composition B, consisting of alumina ($Al_2O_3$), calcium oxide (CaO), and magnesium oxide (MgO), and, optionally, titanium oxide, boron oxide and/or $CaF_2$, and wherein before heating the assembly formed by the parts and the brazing composition to the brazing temperature, a supply of silicon in a non-oxidized form is carried out on the surfaces to be assembled of the parts to be assembled and/or a supply of silicon in a non-oxidized form is carried out in surface layers comprising the surfaces to be assembled of the parts to be assembled, and/or a supply of silicon in non-oxidized form is added to the non-reactive brazing composition.

33. Method according to claim 28, wherein the silicon carbide based materials are SiC/SiC composites, said SiC/SiC composites with fibres or with "whiskers".

34. Method according to claim 28, wherein the silicon carbide based materials are C/SiC composites, said C/SiC composites with carbon fibres or "whiskers" and with SiC matrix.

* * * * *